June 16, 1925. 1,542,019
J. P. WHITAKER ET AL
INSTRUMENT FOR MEASURING OPTICAL FRAMES
Filed June 8, 1923 2 Sheets-Sheet 1
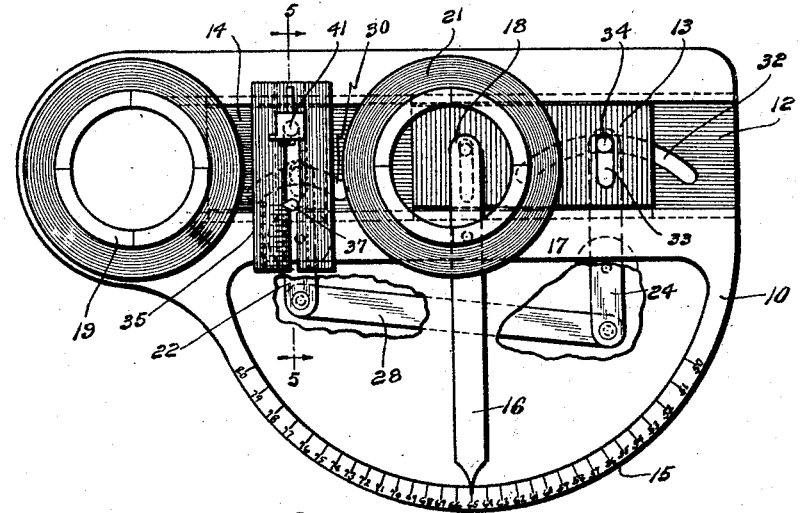
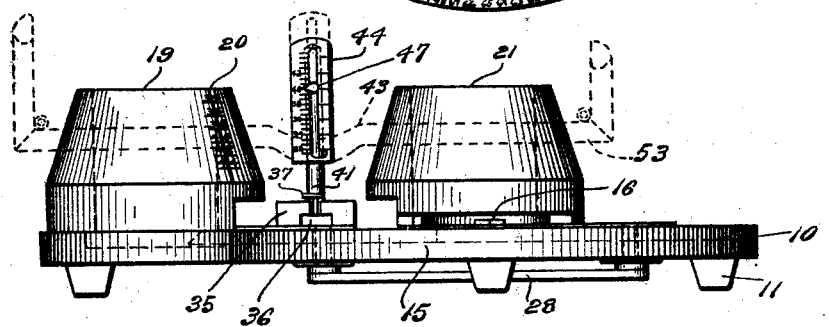
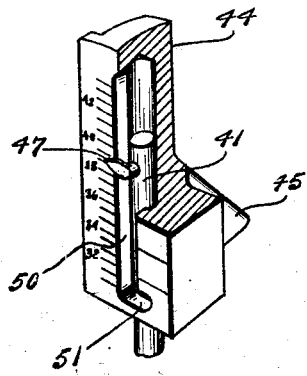
INVENTOR.
Joseph P. Whitaker
BY John Fielding
Barlow & Barlow
ATTORNEYS

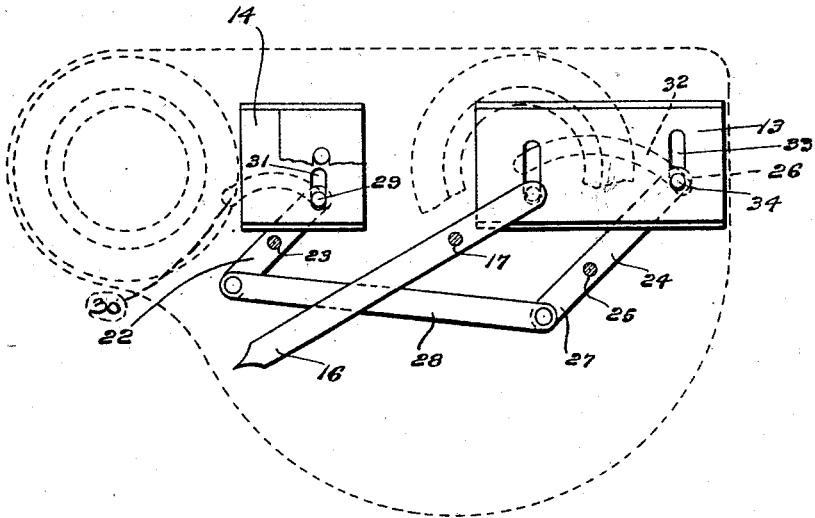
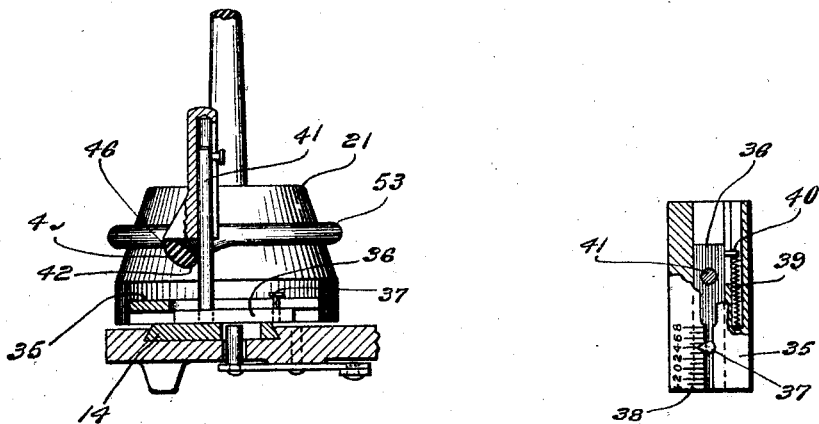
Fig. 4
Fig. 5
Fig. 6
Inventor
Joseph P. Whitaker
John Fielding Patented June 16, 1925.

1,542,019

UNITED STATES PATENT OFFICE.

JOSEPH P. WHITAKER, OF APPONAUG, AND JOHN FIELDING, OF PROVIDENCE, RHODE ISLAND.

INSTRUMENT FOR MEASURING OPTICAL FRAMES.

Application filed June 8, 1923. Serial No. 644,286.

*To all whom it may concern:*

Be it known that we, JOSEPH P. WHITAKER and JOHN FIELDING, citizens of the United States, residing at Apponaug and Providence, respectively, in the counties of Kent and Providence, respectively, and State of Rhode Island, have invented certain new and useful Improvements in Instruments for Measuring Optical Frames, of which the following is a specification.

This invention relates to improvements in the construction of instruments for measuring optical frames, more particularly those formed of non-metallic materials such as celluloid, zylonite, shell and the like; and the object of this invention is to provide a simple and practical instrument of this character which will quickly and accurately measure and indicate the interpupillary distance of the frame by simply positioning the frame to be measured thereon.

A further object of the invention is to provide in an instrument of this character a pair of tapered hub members having graduated surfaces whereby the eye sizes of the frames are also obtained by the position of the frame on the instrument.

A still further object of the invention is the provision of means controlled by the spacing of the hubs on which the frames are mounted for automatically positioning the bridge measuring device in the center of the bridge.

The invention further consists in the provision of means whereby the positioning of the optical frame upon the measuring instrument automatically sets an indicator to show the height of the bridge whether it is on, above or below the common center line through the lenses or lens rims.

A still further object of the invention is the provision of means in the bridge measure for determining whether or not the bridge is set on a plane with the center of the lens rims or to indicate the amount the bridge is set either forward or backward from the central plane of the lens rims.

With these and other objects in view, the invention consists of certain novel features of construction, as will be more fully described, and particularly pointed out in the appended claims.

In the accompanying drawings:

Figure 1 is a plan view illustrating our improved lens frame measuring instrument also illustrating portions broken away to better show the operating parts beneath the base plate.

Figure 2 is a front elevation of our improved machine illustrating a pair of lens frames in dotted lines as mounted thereon.

Figure 3 is a perspective view of the nose bridge measuring slide which is designed to indicate the amount the bridge is set either forwardly or backwardly of the plane of the lenses.

Figure 4 is a view showing the two slide plates and their lever connections whereby one is moved double the distance of the other and the interpupillary distance indicating pointer, other portions of the device being indicated in dotted lines.

Figure 5 is a section on line 5—5 of Figure 1, looking in the direction of the arrow and showing a portion of the lens frame. mounted on the instrument in position to be measured.

Figure 6 is a top view of the gage plate and contact post for measuring the height of the bridge either on or above or below a common center line through the lenses.

It is found in the measuring of optical frames, particularly of the non-metallic construction, of great advantage to be able to readily and accurately determine the interpupillary distance between the lens rims; also to obtain the size of the lens rims, the height of the bridge either above or below the common center line of the lenses and also to obtain the position of the bridge as to the amount it is set either forward or back relatively to the middle plane of the lenses when mounted in the frame, and it is found of great advantage to be able to determine all of these four measurements in a single instrument upon positioning the optical frame thereon; and the following is a detailed description of one construction of device by which all of these results may be readily obtained:—

With reference to the drawings, 10 designates the base plate of an instrument, which is mounted upon short legs 11 to set on any suitable support, the rear of the plate being provided with a longitudinally-disposed dovetailed groove 12 in which are mounted two slides 13 and 14, presently described. The front portion of this plate is preferably formed on the arc of a circle as at 15, and is graduated to indicate the interpupillary distance between the lens rims in some desired unit of measure, this distance being indicated by the free end of a pointer 16, which is pivoted at 17 and connected at its opposite end 18 to the slide 13. On the left end of this frame is mounted a fixed hub, boss or post 19 which has inclined or tapered surfaces, preferably of frusto-conical shape, and by the term "frusto-conical" we include a hub having a surface in which the bearing portions taper toward a common center and either a continuous engaging surface or one having spaced-apart engaging bars, fingers or bearing surfaces is graduated as at 20 on its inclined face to indicate the eye size of the lens rims.

A correspondingly-shaped post or hub 21 is mounted upon and fixed to the slide 13 by which construction this second post may be moved towards or from the first or fixed post to accommodate frames having different interpupillary distances, whereby when it is desired to obtain the measurement of the interpupillary distance between the lens rims, it is only necessary to place one rim of the frame on the fixed post and then adjust the movable post to receive the second frame, the tapered portion of the post serving to accurately center it in its rim and the movement of this hub towards or from the fixed hub serves to swing the free end of the pointer 16 on its pivot 17 over the graduated edge of the plate to indicate the interpupillary distance of the frame being measured.

It will also be observed that the taper of the frusto conical hub upon being graduated also serves to measure the eye size of the lens rims. Thus it will be seen that by simply placing the frame upon these two tapered hub members two measurements are obtained; first, the interpupillary distance between the lens rims and the lens size of the rims.

In order to obtain accurate measurements of the nose bridge member both as to its height above the common center line through the lenses and as to its position either forward or back relative to the plane of the lenses, we have mounted a measuring device upon the slide 14 and have connected this slide to the slide 13 through levers 22 and 24 and rod 28, to move in unison therewith but one-half its distance, which movement is accomplished as best illustrated in Figure 4, by pivoting lever 22 at 23 at its center, and lever 24 at 25 so that its outer end 27 will swing one-half the distance of its opposite end 26 which is connected to slide 13. These levers are mounted beneath the base plate of the device and lever 23 is connected to the slide 14 by a pin 29 through the segmental slot 30 in the base plate, to work in the slot 31 in the slide 14, while the lever 24 is connected through pin 34 to work in the segmental slot 32 in the base plate and the slot 33 in the slide 13, whereby a movement of slide 13 imparts a movement one-half its distance to slide 14 so that the bridge measuring device is always in position to engage the middle portion of the nose bridge when the frame to be measured is mounted on this measuring instrument.

In order to obtain the measurements of the bridge of the frame 53 to ascertain its height whether on the common center line through the lens, or above or below the same, we have mounted a fixed graduated and grooved guide plate 35 on the slide 14 and in the groove of this guide we have mounted a slide plate 36 which carries at one end a pointer 37, see Figure 6, to be moved over the graduations 38 on the guide plate, and this slide plate is normally pressed in one direction by a spring 39, which presses against the laterally-extending pin 40 thereon. On this slide plate we have mounted an upright pin 41 which is adapted to engage the inner edge 42 of the bridge 43, see Figure 5, and when the lens frame is swung into position after having first placed one of the lens rims over the fixed hub 19 and then swinging the other rim inwardly over the movable hub 21, the nose bridge is caused to engage the upright pin 41 and carry it inwardly, and its measurement is thus indicated by the pointer 37 on the graduated portion 36 of the guide plate, if on zero line it indicates that the bridge is on the common center line through the lenses, and if above or below this line the distance the bridge is either above or below this common center line is indicated.

In order to obtain the amount that the bridge is set either forward or backward of the center plane of the lens rims, we have mounted a measuring slide 44 on this pin 41 having a rearwardly-projecting finger 45 adapted to engage the upper edge 46 of the nose bridge, and when the lens frame is placed on the instrument for the purpose of being measured and the bridge measuring slide is dropped to bring its projection into engagement with the upper edge of the bridge and its finger 47 points exactly to a figured line on the slide which corresponds to that indicating the measurement of the lens size by the position of the frame on the hub 19, then it is shown that the nose bridge is on a plane which corresponds to that of the center of the lens rims, and if this finger points to any of the lines above that of the lens size figure, it shows the amount that the bridge is set forward of the plane of the lenses, and if below, the amount that the bridge is set back from the center of the lens plane.

It will be noted that this measuring slide 44 is provided with a vertically-disposed slot 50 through which the finger 47 extends and that the lower end of this slot is laterally offset as at 51 which serves to permit of a slight rotation of the slide to place the finger in this offset whereby the slide may be retained up out of operating position, when desired.

By the use of our unique measuring instrument, it will be seen that the four necessary measurements of a lens frame are readily and accurately obtained.

The foregoing description is directed solely towards the construction illustrated, but we desire it to be understood that we reserve the privilege of resorting to all the mechanical changes to which the device is susceptible, the invention being defined and limited only by the terms of the appended claims.

We claim:

1. An instrument for measuring optical frames, comprising a pair of relatively adjustable members adapted to be spaced to receive eye wires of frames having different interpupillary distances, and means controlled by the relative movement of said members for indicating the interpupillary measurement of each frame positioned thereon.

2. An instrument for measuring optical frames, comprising a pair of relatively adjustable hub members adapted to be spaced to receive the eye wires of frames having different interpupillary distances, a graduated surface, a pointer movably mounted relative thereto and means whereby the movement of one of said members is caused to operate said pointer over a graduated surface to indicate the interpupillary distance of each frame positioned thereon.

3. An instrument for measuring optical frames, comprising a pair of relatively adjustable hub members having conically-shaped engaging surfaces to automatically centralize the eye wires of the frames thereon, one of said members being adapted to be moved to adapt said members to receive the eye wires of frames having different interpupillary distances, and means for indicating the interpupillary distance of each frame positioned thereon.

4. An instrument for measuring optical frames, comprising a base, a pair of relatively adjustable hub members on said base having frusto conically shaped graduated engaging surfaces to automatically centralize the eye wires of its frame thereon and means for measuring the interpupillary distance of the frame, said graduated surface also serving to simultaneously measure and indicate the eye sizes of the frame.

5. An instrument for measuring optical frames, comprising a base, a slide on said base, a pair of frame-receiving hubs one being fixed to said base and the other mounted on said slide to be moved relatively to said fixed hub to receive the lens rims of a frame thereon, and means operated by the movement of said movable hub for indicating the interpupillary distance of the frame mounted on said hubs.

6. An instrument for measuring optical frames, comprising a base, a slide on said base, a pair of frame-receiving hubs one being fixed to said base and the other mounted on said slide to be moved relatively to said fixed hub, both of said hubs having frusto conically shaped surfaces and being of a size to fit the lens rims, and a pointer operated by the movement of the movable hub for indicating the interpupillary distance of the frame mounted thereon.

7. An instrument for measuring optical frames, comprising a base, having a portion graduated on the arc of a circle, a slide on said base, a pair of frame-receiving hubs one being fixed to said base and the other mounted on said slide to be moved relatively to said fixed hub both of said hubs having frusto conically shaped surfaces and being of a size to fit the lens rims, and a pivoted pointer having its free end adapted to move over said graduated arc by the movement of said movable hub to indicate the interpupillary distance of the frame mounted thereon.

8. An instrument for measuring optical frames, comprising a pair of relatively adjustable upstanding hub members to receive the eye wires of frames of different interpupillary dimensions, means operated by the movement of one of said members to indicate the interpupillary distance of each frame, a bridge measuring device, and means controlled by the spacing of said members for properly positioning said bridge measure relative to said hub members.

9. An instrument for measuring optical frames, comprising a base-member, a slide movable on said base, a pair of frame-receiving hubs, one fixed to said base and the other mounted on one of said slides to be moved relatively to said fixed hub, said hubs being adapted to receive eye wires of frames of different widths, a nose bridge measuring device mounted on said slide, and means controlled by the spacing of said hub members for moving said bridge measure to center the same in the correct position relative to said hubs.

10. An instrument for measuring optical frames, comprising a base plate, a pair of relatively adjustable hub members adapted to be spaced to receive the eye wires of frames of different interpupillary dimensions, a slide member, a bridge measuring device mounted on said slide, means whereby the spacing of said hub members moves the bridge measure on its slide to the center of the bridge, and means carried by said bridge measure for indicating the height of the bridge relatively to a common diametral line through both lens rims.

11. An instrument for measuring optical frames, comprising a pair of relatively adjustable upstanding members adapted to be spaced to receive the eye wires of frames of different interpupillary dimensions, means operated by the movement of said members to indicate the interpupillary distance of each frame, a bridge measuring device, means controlled by the spacing of said members for positioning said bridge measure to center the same in the correct position relative to said hubs, and means carried by said bridge measure for indicating the height of the bridge relatively to a common diametrical line through both lens rims.

12. An instrument for measuring optical frames, comprising a pair of relatively adjustable upstanding members adapted to be spaced to receive the eye wires of frames of different widths, means operated by the movement of one of said members to indicate the interpupillary distance between the members, a bridge measuring device, means controlled by the spacing of said members for positioning said bridge measure in the center of the bridge, and means carried by said bridge measure controlled by the positioning of the frame on the instrument for indicating the height of the bridge relative to a common diametral central line through both lens rims.

13. An instrument for measuring optical frames, comprising a pair of relatively adjustable members adapted to be spaced to receive the eye wires of a frame, a bridge measure, means whereby the positioning of said members positions said bridge measure in the center of the bridge, means for indicating the height of the bridge either above or below the common central line through the lens frames, and means movable into measuring position with said bridge measure for indicating the height of the bridge relatively to the central plane through the lens rims.

14. An instrument for measuring optical frames, comprising a pair of relatively adjustable members adapted to be spaced to receive the eye wires of a frame, a bridge measure, means whereby the positioning of said members positions said bridge measure in the center of the bridge, a laterally movable upstanding pin movable into measuring position with said bridge measure for engaging the inner surface of the bridge member for indicating the height of the bridge either above or below the common center line through the lens frames, and a slidable gage member adapted to rest upon the upper edge of the bridge to indicate the height of the bridge relative to the central plane through the lens rims.

In testimony whereof we affix our signatures.

JOSEPH P. WHITAKER.
JOHN FIELDING.